US012710713B2

(12) United States Patent
Koyama et al.

(10) Patent No.: US 12,710,713 B2
(45) Date of Patent: Aug. 18, 2026

(54) IMAGE FORMING APPARATUS INCLUDING HEATING ROTATING MEMBER

(71) Applicant: CANON KABUSHIKI KAISHA, Tokyo (JP)

(72) Inventors: Kengo Koyama, Chiba (JP); Toshinori Kimura, Ibaraki (JP); Teruhiko Suzuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 56 days.

(21) Appl. No.: 18/599,332

(22) Filed: Mar. 8, 2024

(65) Prior Publication Data

US 2024/0345516 A1 Oct. 17, 2024

(30) Foreign Application Priority Data

Apr. 17, 2023 (JP) ................................ 2023-067306

(51) Int. Cl.
*G03G 15/20* (2006.01)

(52) U.S. Cl.
CPC ....... *G03G 15/205* (2013.01); *G03G 15/2064* (2013.01); *G03G 2215/00084* (2013.01)

(58) Field of Classification Search
CPC ......................... G03G 15/205; G03G 15/5004
See application file for complete search history.

(56) References Cited

U.S. PATENT DOCUMENTS

2004/0131375 A1* 7/2004 Lee ...................... G03G 15/205 399/70
2011/0142476 A1 6/2011 Tsunoda
2013/0195493 A1 8/2013 Hase et al.

FOREIGN PATENT DOCUMENTS

JP H07288612 A 10/1995
JP 2004233413 A 8/2004
JP 2007078909 A 3/2007
JP 2022097934 A 7/2022

OTHER PUBLICATIONS

English translation of JP2007078909.*
Extended European search report issued in European Appln. No. 24162913.8 mailed on Aug. 27, 2024.

* cited by examiner

*Primary Examiner* — Arlene Heredia Ocasio
(74) *Attorney, Agent, or Firm* — ROSSI, KIMMS & McDOWELL LLP

(57) ABSTRACT

An image forming apparatus which is capable of shifting to a standby state in which a heating rotating member is maintained at a first temperature during non-image forming, and to a sleep state in which a heater is turned off during non-image forming. The heater turns on before a predetermined time period elapses from when the image forming apparatus shifts to the sleep state such that the heating rotating member is maintained at a second temperature, which is equal to or less than the first temperature when the predetermined time period elapses from when the image forming apparatus shifts to the sleep state.

9 Claims, 17 Drawing Sheets

IMAGE FORMING APPARATUS INCLUDING HEATING ROTATING MEMBER

BACKGROUND OF THE INVENTION

Field of the Invention

This invention relates to an image forming apparatus having a fixing device that fixes a toner image formed on a recording material by heating and melting the toner image.

Description of the Related Art

Conventional image forming devices such as printers, copiers, or facsimiles are known which use a heating fixing device that fixes a toner image on a recording material by heating and melting the toner image formed on the recording material. Some of such image forming apparatuses have a normal mode and a sleep mode (e.g., disclosed by Japanese Patent Application Laid-Open No. 07-288612). In the normal mode, the heating fixing device is maintained at a temperature suitable for image formation. The sleep mode is for reducing power consumption of the heating fixing device when the image forming apparatus remains unused for a certain period of time. In such image forming apparatuses, power is supplied to the heater provided in the heating fixing device in the normal mode, and power supply to the heater is turned off in the sleep mode.

However, in such image forming apparatuses, it takes some time to return from the sleep mode to the normal mode because the temperature of the heating fixing device drops rapidly before and after the mode shift from the normal mode to the sleep mode. This causes a significant amount of time-waiting stress on the user.

In contrast, Japanese Patent Application Laid-Open No. 2004-233413 discloses an image forming apparatus that continues the normal mode from the time t100, when the image forming operation completes, to the time t101, when the shift to low-power mode begins, as shown in FIG. 14.

However, in Japanese Patent Application Laid-Open No. 2004-233413, the normal mode continues until the time t101, when the shift to the low power mode is initiated. Therefore, there is a problem that a state of high power consumption always occurs for a predetermined time period and the effect of reducing power consumption becomes small.

SUMMARY OF THE INVENTION

The purpose of the present invention is to provide an image forming apparatus that can minimize the time waiting stress for the user while reducing power consumption.

An image forming apparatus according to the present invention, comprises:

- a heating rotating member which has a heater and is heated by the heater;
- a pressing rotating member which contacts the heating rotating member to form a nip portion and fixes a toner image on a recording material together with the heating rotating member;
- a first temperature detecting portion which detects a temperature of the heating rotating member; and
- a control portion which controls the heater based on a detection result of the first temperature detecting portion, wherein the image forming apparatus is capable of shifting to a standby state in which the heating rotating member is maintained at a first temperature during non-image forming, and to a sleep state in which the heater is turned off during non-image forming, and wherein the control portion turns on the heater before a predetermined time period elapses from when the image forming apparatus shifts to the sleep state such that the heating rotating member is maintained at a second temperature, which is equal to or less than the first temperature when the predetermined time period elapses from when the image forming apparatus shifts to the sleep state.

Further features of the present invention will become apparent from the following description of exemplary embodiments with reference to the attached drawings.

DESCRIPTION OF THE EMBODIMENTS

Figure 1:
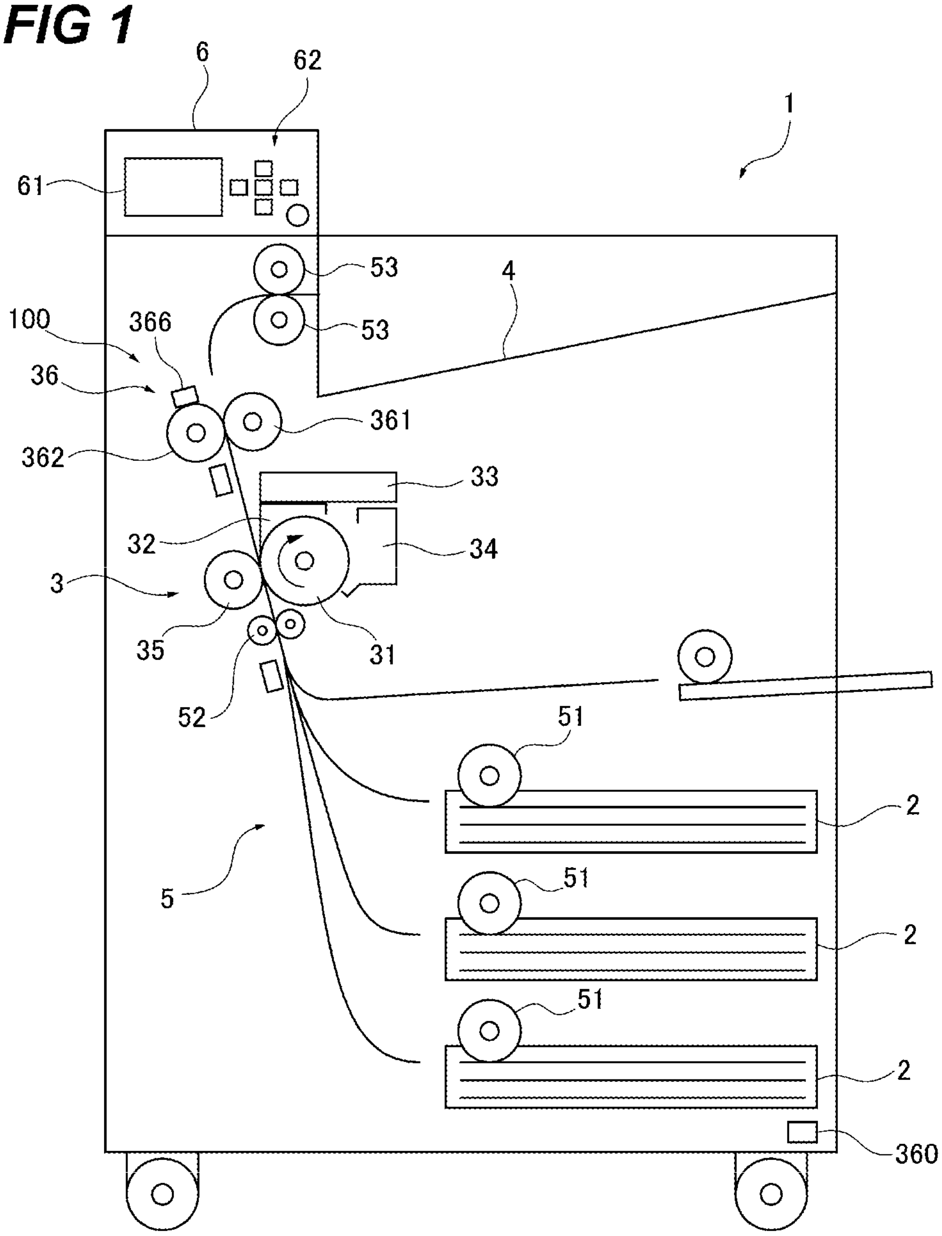
FIG. 1 is a schematic diagram showing the configuration of an image forming apparatus according to Embodiment 1 of the present invention.

Hereinafter, with reference to the drawings, embodiments of the present invention will be described in detail.

Embodiment 1

<Image Forming Apparatus>

The configuration of the image forming apparatus 1 according to Embodiment 1 of the present invention will be described referring to FIGS. 1 and 2.

The image forming apparatus 1 is exemplified here as a printer. The image forming apparatus 1 has the sheet feeding cassette 2, the image forming portion 3, the discharge tray 4, the sheet conveying mechanism 5, the operation portion 6, the communication I/F 7, and the fixing device 100.

The sheet feeding cassettes 2 are used to accommodate recording materials of different sizes.

The image forming portion 3 forms an image on the recording material conveyed by the later described conveying roller 52 of the sheet conveying mechanism 5 and conveys it to the later described discharge roller 53 of the sheet conveying mechanism 5. The image forming portion 3 has the photosensitive drum 31, the charging portion 32, the exposure portion 33, the developing portion 34, and the transfer portion 35.

The photosensitive drum 31 has a drum shape and its surface is configured with a photosensitive member. The photosensitive drum 31 rotates according to control signals input from the later described CPU (Central Processing Unit) 8 in the fixing device 100.

The charging portion 32 electrically charges the surface of photosensitive drum 31 according to control signals input from the CPU 8.

The exposure portion 33 irradiates the photosensitive drum 31 charged by the charging portion 32 with a laser beam based on image data input from the CPU 8 to form an electrostatic latent image on the photosensitive drum 31.

The developing portion 34 supplies toner to an electrostatic latent image formed on the photosensitive drum 31 to form a toner image on the photosensitive drum 31 according to control signals input from the CPU 8.

The transfer portion 35 is driven according to control signals input from the CPU 8. The transfer portion 35 transfers the toner image on the photosensitive drum 31 to the recording material conveyed by the conveying rollers 52. The transfer portion 35 conveys to the fixing device 100 the recording material onto which the toner image has been transferred.

The recording materials conveyed by the discharge rollers 53 of the sheet conveying mechanism 5 are discharged onto the discharge tray 4. The sheet conveying mechanism 5 conveys the recording materials accommodated in the sheet feeding cassettes 2 toward the discharge tray 4. The sheet conveying mechanism 5 has the sheet feeding rollers 51, the conveying rollers 52, and the discharge rollers 53.

The sheet feeding rollers 51 pick up the recording materials from the sheet feeding cassettes 2 one sheet at a time and feeds it to the conveying rollers 52.

The conveying rollers 52 convey the recording materials fed by the sheet feeding rollers 51 to the image forming portion 3.

The discharge rollers 53 discharge the recording materials conveyed from the fixing device 100 to the discharge tray 4.

The operation portion 6 accepts operation instructions from a user and outputs electrical signals including printing data and printer control commands, etc., to CPU 8 in response to the accepted operation instructions. As shown in FIG. 1, the operation portion 6 has the display 61 and the key switches 62.

The display 61 is a liquid crystal display or the like that displays operation guides and other information to a user under the control of the CPU 8.

The key switches 62 are for accepting operating instructions for a user to select an operation guide displayed on the display 61 or to input data such as setting values. The key switches 62 output electrical signals including printing data and print control commands, etc., to the CPU 8 in response to accepted operation instructions. The key switches 62 allow the user to input the settings of the image forming apparatus 1.

The communication I/F 7 transmits and receives printing data and printer control commands, etc., which are operation instructions to cause image formation, to and from the PC (Personal Computer) 9 connected by a cable or the like to the image forming apparatus 1 in order to enable data transmission and reception. The communication I/F 7 outputs printing data and printer control commands, etc. received from the PC 9 to the CPU 8.

The fixing device 100 heats the recording material onto which the toner image is transferred and conveyed from the image forming portion 3, to melt the toner image so that the toner image is fixed onto the recording material. The fixing device 100 conveys the recording material on which the toner image is fixed to the discharge rollers 53 of the sheet conveying mechanism 5.

In this embodiment, the period between when an instruction of printing job to form an image is issued and when the last sheet for the printing job is discharged to the discharge tray 4 is defined as image forming period. The period during which there is no printing job instruction and no image formation is taking place is defined as non-image forming period.

<Configuration of Fixing Device>

The configuration of the fixing device 100 an embodiment of the present invention will be described in detail with reference to FIGS. 1 to 4.

The fixing device 100 has the CPU 8, the power supply connection terminal 11, the power supply terminal 12, the zero-crossing detection circuit 14, the fixing portion 36, the environment sensor 360, the triac 364, the photo-triac coupler 365, the temperature sensor 366, the amplifier 367, the A/D converter 368, the amplifier 369, and the A/D converter 370.

The CPU 8 as the control portion is equipped with a ROM (Read Only Memory) that stores control programs, etc., and a RAM (Random Access Memory) that stores data, both of which are not shown in the figure. The CPU 8 reads a control program from the ROM and executes it to control the operation of the entire image forming apparatus 1.

The CPU 8 outputs control signals for controlling the operation of the image forming portion 3 and the sheet conveying mechanism 5, etc., to the drive motors, etc., (not shown) that drive the image forming portion 3 and the sheet conveying mechanism 5 in response to printer control commands, etc., input from the communication I/F 7 or the operation portion 6. The CPU 8 outputs control signals to the drive motors, etc., that drive the image forming portion 3 and the sheet conveying mechanism 5, so that the image forming portion 3 and the sheet conveying mechanism 5, etc., are driven to perform image forming operations.

The CPU 8 generates image data based on printing data input from communication I/F 7 or the operation portion 6, and outputs the generated image data to the exposure portion 33 of image forming portion 3. The CPU 8 performs power control, such as shifting from the normal mode, in which images can be formed, to the low-power mode (power-saving mode), in which power is supplied only to a portion of the image forming apparatus 1. The CPU 8 controls the heater 363 based on the detection result of the temperature sensor 366.

The CPU 8 has the timer 81, the clock portion 82, the table storage portion 83, and the reception time storage portion 84.

The timer 81 down-counts the set time and outputs a time-up signal after the set time has elapsed.

The clock portion 82 obtains the current time.

The table storage portion 83 stores a table of set values for temperature control of the heating roller 362 in the power-saving mode.

The reception time storage portion 84 stores, as reception time data, the history of the times when the operating instructions are received.

The CPU 8 obtains the detection temperature T, which is the current temperature of the heating roller 362, based on the digital signal input from the A/D converter 368. The CPU 8 obtains, as the ambient temperature, the environment temperature TD of the location where the image forming apparatus 1 is placed based on the digital signal input from the A/D converter 370.

The CPU 8 outputs a control signal to the photo-triac coupler 365 based on the obtained detection temperature T to heat the heating roller 362 by the heater 363 or to stop the heating of the heater 363 to the heating roller 362. The CPU 8 performs a temperature control to maintain a temperature of the heating roller 362 at the target temperature by heating the heating roller 362 with heater 363 or by stopping the heating of the heater 363 to the heating roller 362.

The CPU 8 sets the predetermined time period based on the obtained detection temperature T, the obtained environment temperature TD, and the table stored in table storage portion 83. The CPU 8 outputs a control signal to the photo-triac coupler 365 by the time when the timer 81 outputs a time-up signal, or shifts to the low power mode at the set time.

The AC (Alternating Current) power supply 13 and the zero-crossing detection circuit 14 are connected between the power supply connection terminals 11 and 12. Further, the series-connected the heater 363 and the triac 364 are connected between the power supply connection terminals 11 and 12.

The zero-crossing detection circuit 14 detects the zero-crossing timing at which the AC voltage crosses 0 V and outputs a zero-crossing signal indicating the detected zero-crossing timing to the CPU 8.

The fixing device 36 is driven according to control signals input from the CPU 8. The fixing portion 36 heats the recording material onto which the toner image is transferred from the transfer portion 35 to fix the toner image on the recording material. The fixing portion 36 conveys the recording material on which the toner image is fixed to the discharge roller 53 of the sheet conveying mechanism 5.

The fixing portion 36 has the pressing roller 361, the heating roller 362, the heater 363, and the temperature sensor 366.

The pressing roller 361, as a pressing rotating member, is rotatable and forms a nip portion in contact with the heating roller 362. The pressing roller 361 presses the recording material that passes between the pressing roller 361 and the heating roller 362 against the heating roller 362 at the nip portion. The pressing roller 361, together with the heating roller 362, nips and conveys the recording material at the nip portion. The pressing roller 361, together with the heating roller 362, fixes the toner image to the recording material.

The heating roller 362 as a heating rotating member is rotatable and is heated by the heater 363 to melt the toner image formed on the recording material.

The heater 363 as a heating means is provided inside the heating roller 362. The heater 363 heats the heating roller 362 by receiving power supply from the AC power source 13 when triac 364 is turned on.

The temperature sensor 366 as a first temperature detecting means is a thermistor or the like, and is provided near the heating roller 362. The temperature sensor 366 detects the temperature of the heating roller 362 and outputs an electrical signal of a voltage corresponding to the detected temperature T to the amplifier 367.

The environment sensor 360 as a second temperature detecting means is provided below the sheet cassettes 2, detects the environment temperature TD, which is the temperature outside the image forming apparatus 1, and outputs an electrical signal of a voltage corresponding to the environment temperature TD to the amplifier 369.

The gate of triac 364 is connected to photo-triac coupler 365. The triac 364 is turned on and off by the photo-triac coupler 365. When the triac 364 is turned on, power is supplied from the AC power source 13 to the heater 363, and when the triac 364 is turned off, power supplied from the AC power source 13 to the heater 363 is cut off.

The photo-triac coupler 365 turns on the triac 364 when a control signal to turn on the triac 364 is input from the CPU 8. The photo-triac coupler 365 turns off the triac 364 when a control signal to turn off the triac 364 is input from the CPU 8.

The amplifier 367 amplifies an electrical signal input from the temperature sensor 366 and outputs the amplified electrical signal to the A/D converter 368.

The A/D converter 368 converts an analog electrical signal input from the amplifier 367 into a digital signal and outputs the digital signal to the CPU 8.

The amplifier 369 amplifies an electrical signal input from the environment sensor 360 and outputs the amplified electrical signal to the A/D converter 370.

The A/D converter 370 converts an analog electrical signal input from the amplifier 369 into a digital signal and outputs the digital signal to the CPU 8.

<Operation of Fixing Device>

The operation of the fixing device 100 according to Embodiment 1 of the present invention will be described in detail with reference to FIGS. 1 to 6.

Figure 6:
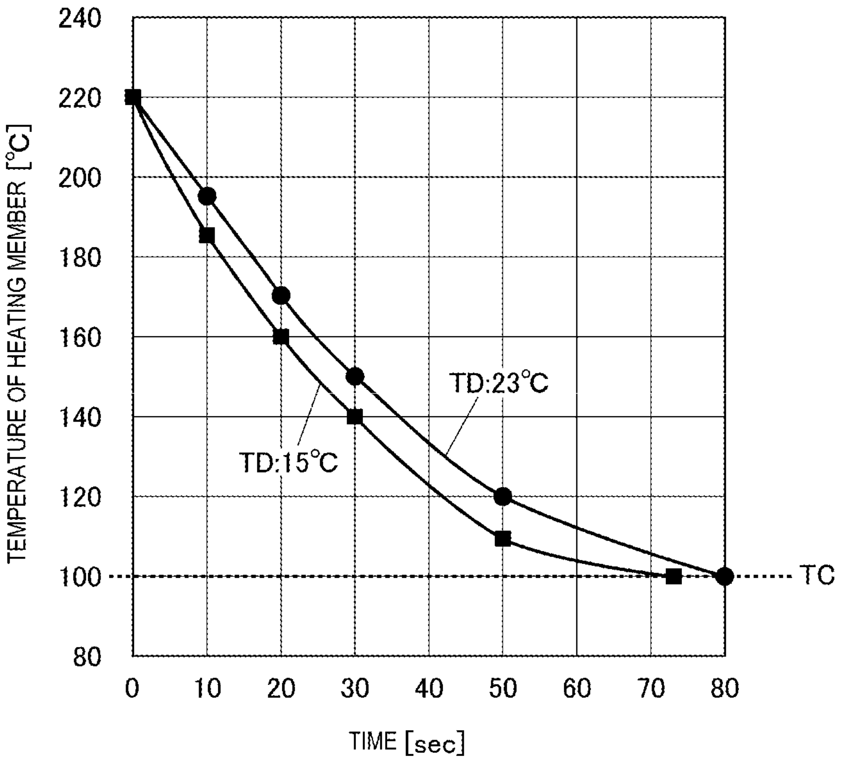
FIG. 6 is a diagram showing the transition of the temperature of the heating member of the fixing device according to Embodiment 1 of the present invention.

In FIG. 6, the temperature of the heating member on the vertical axis indicates the detection temperature T detected by the temperature sensor 366, and the time on the horizontal axis indicates the time period elapsed since the heating of the heater 363 is stopped.

First, the operation of the fixing device 100 during printing (image formation), in which the toner image is fixed to the recording material, will be described.

The CPU 8 outputs a control signal to the photo-triac coupler 365 according to the detected temperature T obtained based on the electrical signal input from the A/D converter 368 each time a zero-crossing signal is input from the zero-crossing detection circuit 14. The CPU 8 controls the heating roller 362 to maintain the predetermined temperature by outputting a control signal to the photo-triac coupler 365.

The CPU 8 outputs to the photo-triac coupler 365 a control signal to turn off the triac 364 when, for example, the obtained detection temperature T is higher than the target temperature TTG for temperature control. Further, the CPU 8 outputs to the photo-triac coupler 365 a control signal to turn on the triac 364 when the detection temperature T is equal to or lower the target temperature TTG.

When the frequency of the AC voltage output from the AC power source 13 is 50 Hz, the CPU 8 executes the temperature control at 10 msec (half-wavelength for 50 Hz) intervals. In addition, since the output timing of the control signal from the CPU 8 to turn on the triac 364 is synchronized with the zero-crossing signal, the triac 364 can be turned on while voltage stress on the triac 364 is reduced.

Next, the operation of the fixing device 100 after the print operation is completed will be described.

Figure 5:
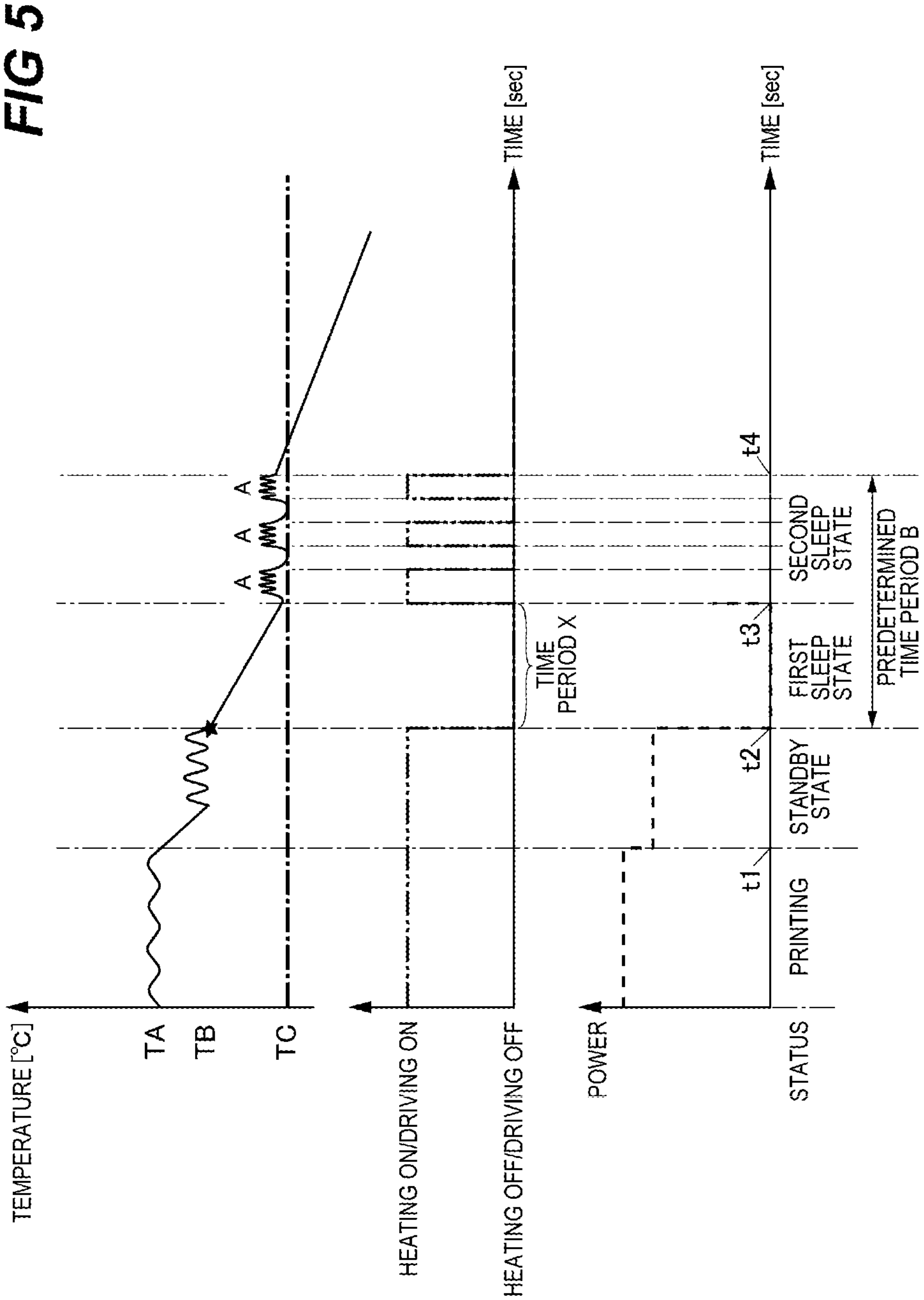
FIG. 5 is a diagram showing a timing chart of the fixing device of the image forming apparatus according to Embodiment 1 of the present invention.

As shown in FIG. 5, at the time t1, when the image forming operation is completed, the CPU 8 shifts the current process from the printing state to the standby state and changes the temperature setting of the heating roller 362 from the control temperature TA during image forming to the control temperature TB (TA>TB). Here, the standby state is the state in which the heating roller 362 is maintained at the control temperature TB as the first temperature during non-image forming. Data for the control temperature TA and the control temperature TB are stored in advance in ROM, etc., (not shown) of the CPU 8. Furthermore, the control temperature TB is set to be a temperature at which image formation is possible when a printing job is issued (standby temperature). The control temperature TA of the heating roller 362 is set to be a temperature at which the fixing device 100 fixes the recording material, and is exemplified here as 160° C. to 180° C. The control temperature TB is exemplified here as 140° C. to 160° C.

The CPU 8 monitors the detection temperature T detected by the temperature sensor 366 based on the electrical signal input from temperature sensor 366 during the period from the time t1 to the time t2 when the predetermined time period elapses from the time t1. The CPU 8 performs a temperature control to maintain the temperature of heating roller 362 at the control temperature TB, which is the target temperature in the standby state by turning on and off the triac 364 via the photo-triac coupler 365 according to the monitored detection temperature T.

At the time t2, the CPU 8 calculates the time period X [sec] (temperature decreasing time period) based on the monitored detection temperature T and the table stored in the table storage portion 83, and sets the calculated time period X [sec].

Specifically, the CPU 8 obtains the temperature characteristics of the detection temperature T detected by the temperature sensor 366 at the environment temperature TD as the outside temperature detected by the environment sensor 360 from a table stored in advance in the table storage portion 83. For example, as shown in FIG. 6, the temperature characteristics of the detection temperature T are different between when the environment temperature TD is 15° C. and when the environment temperature TD is 23° C. Then, the CPU 8 calculates the time period X [sec] until the detection temperature T detected by the temperature sensor 366 becomes the control temperature TC (TB>TC) as the second temperature in the obtained temperature characteristics.

Thus, the CPU 8 sets the time X [sec] using a table stored in advance in the table storage portion 83. As a result, the time period X, which is set based on the detection temperature T detected by the temperature sensor 366, can be corrected by the environment temperature TD detected by the environment sensor 360.

Here, data for the control temperature TC are stored in advance in the ROM, etc. (not shown) of the CPU 8. The control temperature TC is the lower limit of the fixing temperature that can be raised to the printable temperature within a predetermined time period without causing image damage. Furthermore, the control temperature TC is the temperature at which no image defects occur even if the copy button on the key switches 62 is pressed and a copying procedure is started in a predetermined time period, and can be taken as one of the targets for temperature control. The control temperature TC is exemplified here as 100° C. The temperature characteristics of the detection temperature detected by the temperature sensor 366 vary with the environment temperature TD detected by the environment sensor 360. As shown in FIG. 6, the temperature decreases more slowly as the environment temperature TD is higher.

The CPU 8 does not perform any heating operation, drive operation, or temperature detection by temperature sensor 366 in the fixing device 100 until the set time period X [sec] elapses from the time t2, and shifts the current process to the first sleep state in which only the communication I/F 7 and the CPU 8 are energized. The CPU 8 shifts the current process to the first sleep state when the standby state lasts for a predetermined time period from the time t1 to the time t2. As a result, the power consumption is reduced in the time period X [sec]. The CPU 8 returns from the first sleep state to the standby state and performs image forming operations when a printing job is issued from the PC 9 in the first sleep state. The targets to be energized in the first sleep state are not limited to the communication I/F 7 and the CPU 8, but may be parts other than the communication I/F 7 and the CPU 8.

Thus, the first sleep state is characterized in that the temperature detection by the temperature sensor 366 is not performed, the CPU 8 does not obtain the temperature detected by the temperature sensor 366, and the driving of the pressing roller 361 and the heating roller 362 is stopped.

At the time t3 when the time period X [sec] has elapsed from the time t2, the CPU 8 terminates the first sleep state and shifts the current process to the second sleep state. The CPU 8 shifts the current process to the second sleep state at the time t3 which is the optimal timing for preparing for the next printing job. After shifting the current process to the second sleep state, the CPU 8 monitors the detection temperature T detected by temperature sensor 366 and performs a heating operation to maintain the control temperature TC for a predetermined time period A [sec] and a drive operation synchronized with the heating operation, and repeats these operations. Thus, in the second sleep state, the CPU 8 performs the temperature control to maintain the control temperature TC, which is a target temperature lower than the control temperature TA, which is the target temperature during printing operation.

The CPU 8 terminates the second sleep state at the time t4 when the predetermined time period B [sec] (B>X) has elapsed from the time t2.

Thus, the fixing device 100 can be shifted to the standby state, the first sleep state, and the second sleep state. In the above operation of the fixing device 100, even if a printing job is issued during the first state or the second sleep state, no image damage is provoked, so both energy saving and image quality can be achieved. Here, the first sleep state and the second sleep state are states in which the heater 363 is turned off during non-image forming.

In the above operation of the fixing device 100, the heater 363 is turned on in the standby state before the time period X has elapsed since the shift to the first sleep state such that the heating roller 362 is maintained at the control temperature TC after the time period X.

Furthermore, in the above operation of the fixing device 100, the CPU 8 changes the time period X, which is a time period from the shift to the first sleep state until the heater 363 is turned on, based on the detection temperature T detected by the temperature sensor 366, using a table stored in advance in the table storage portion 83. In this case, the CPU 8 set the time period X1 to be the time period from the shift to the sleep state until the heater 363 is turned on when the temperature of the heating roller 362 at the time of shift to the first sleep state is the detection temperature T1. Further, if the temperature of the heating roller 362 at the time of the shift to the sleep state is the detection temperature T2 which is higher than the detection temperature T1, the CPU 8 sets the time period from the shift to the sleep state until the heater 363 is turned on to the time period X2 which is greater than the time period X1.

<Operation of Image Forming Apparatus>

Figure 7A:
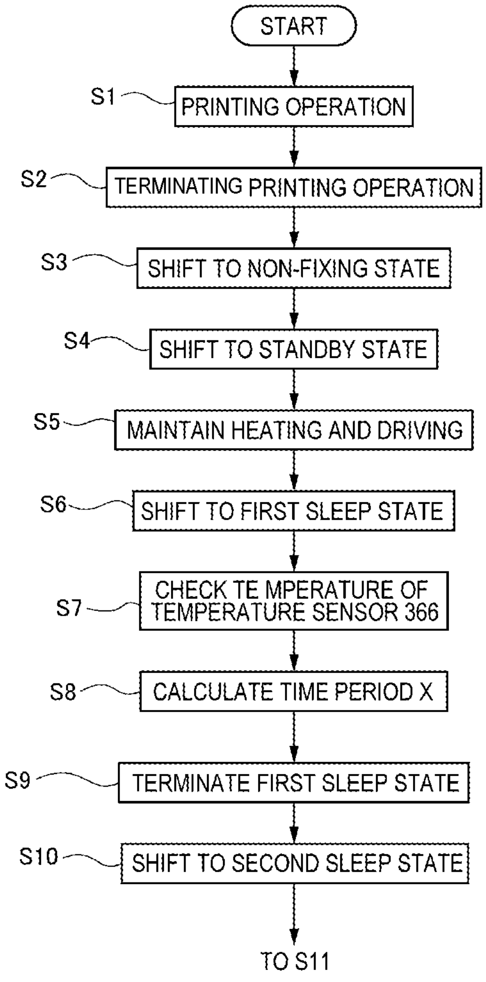
FIG. 7A is a flow diagram showing first half of operations of the fixing device according to Embodiment 1 of the present invention.
Figure 7B:
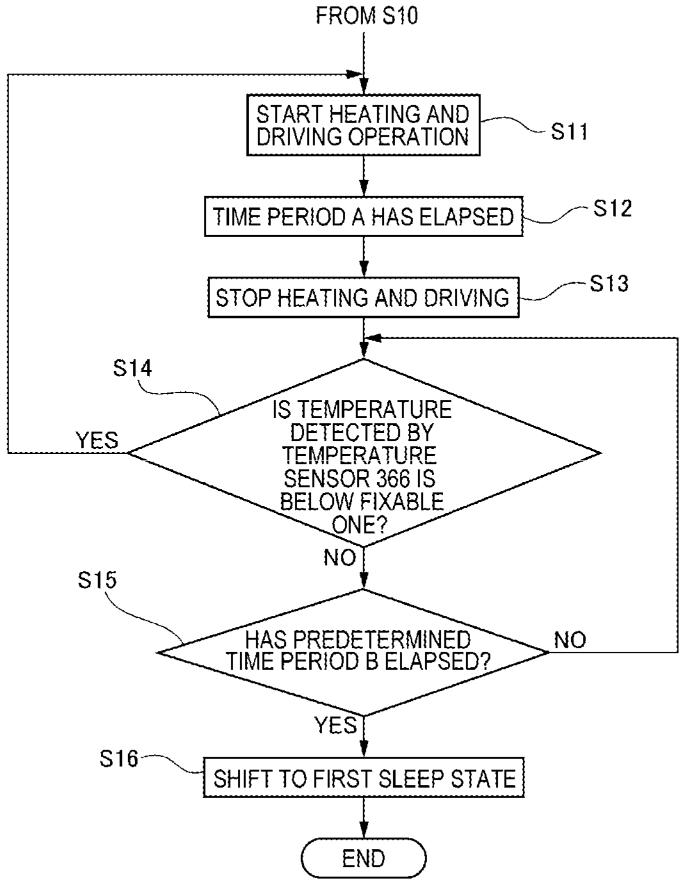
FIG. 7B is a flow diagrams showing latter half of operations of the fixing device according to Embodiment 1 of the present invention.

The operation of the image forming apparatus 1 according to Embodiment 1 of the present invention will be described in detail with reference to FIGS. 7A and 7B.

Next, the CPU 8 obtains printing data and printer control commands from the PC 9 via the communication I/F 7 as image forming operation instructions to the image forming apparatus 1. The image forming operation instructions are made in response to the operation of a user of the PC 9 for performing a printer operation of the image forming apparatus 1. The CPU 8 then performs a print operation based on the obtained printing data and the printer control commands (step S1), and then terminates the printing operation (step S2).

Next, the CPU 8 shifts the heating roller 362 and the pressing roller 361 from the pressing state to the non-pressing state to put the fixing portion 36 in the non-fixing state (step S3).

Next, the CPU 8 shifts the current process to the standby state in which the control temperature TB is maintained lower than the control temperature TA during image formation (step S4).

Next, the CPU 8 monitors the detection temperature T detected by the temperature sensor 366 based on the electrical signal input from the temperature sensor 366. The CPU 8, then, turns on or off the triac 364 via the photo-triac coupler 365 to make control to maintain the temperature of the heating roller 362 at the control temperature TB to continue the heating temperature control operation and the rotational driving operation (step S5). As a result, the heating and temperature control operation and the rotational driving operation can be maintained for a predetermined time at the control temperature TB (standby temperature) at which image formation is possible even if the next printing job is issued.

Next, the CPU 8 shifts the current process to the first sleep state in the low power mode (step S6). The shift to the first sleep state may be performed by a user using the operation portion 6. Alternatively, the CPU 8 automatically shifts the current process to the first sleep state when no printing job is issued for a predetermined time period during non-image forming.

Next, the CPU 8 obtains the detection temperature T detected by the temperature sensor 366 and checks the detection temperature T (step S7).

Next, the CPU 8 calculates the time period X based on the detection temperature T detected by the temperature sensor 366, the environment temperature TD detected by the environment sensor 360, and the table stored in the table storage portion 83 (step S8). Specifically, the CPU 8 calculates the time period X during which the detection temperature T decreases to the control temperature C from the control temperature T based on the detection temperature T, the environment temperature TD, and the table. For example, the CPU 8 calculates the time period X of 60 sec (X=60 [sec]) based on the data shown in FIG. 8 when the environment temperature TD is 23° C. and the detection temperature T detected by the temperature sensor 366 at the time of the shift to the first sleep state is 170° C.

Next, the CPU 8 terminates the first sleep state after the time period X has elapsed since the shift to the first sleep state (step S9).

Next, the CPU 8 shifts the current process to the second sleep state, where the control temperature TC is maintained, which is lower than the control temperature TB maintained in the standby state (step S10).

Next, the CPU 8 monitors the detection temperature T detected by the temperature sensor 366 based on the electrical signal input from the temperature sensor 366. The CPU 8, then, turns on the triac 364 via the photo-triac coupler 365 to start the heating and temperature control operation and the rotational driving operation (step S11).

Next, the CPU 8 turns off the triac 364 via the photo-triac coupler 365 when the time period A has elapsed since the operation of the step S11 is started (step S12). As a result, the heating and temperature control operation and the rotational driving operation are stopped (step S13).

As described above, the first sleep state is a state in which the detection temperature T detected by the temperature sensor 366 is not monitored, and power to all but the CPU 8 and the communication I/F 7 is cut off. In contrast, the second sleep state is a state in which a temperature control is performed to maintain a predetermined control temperature by monitoring the detection temperature T detected by the temperature sensor 366 and by supplying power to the fixing portion 36.

Next, the CPU 8 determines whether the detection temperature T detected by the temperature sensor 366 becomes lower than the control temperature TC, which is the fixable temperature (step S14).

The CPU 8 returns the current process to the operation of the step S11 when the detection temperature T detected by the temperature sensor 366 falls below the control temperature TC (step S14: YES).

On the other hand, if the detection temperature T detected by the temperature sensor 366 is equal to or higher than the control temperature TC (step S14: NO), the CPU 8 determines whether the time period B has elapsed since the shift to the first sleep state (step S15).

The CPU 8 returns the current process to the operation of the step S14 when the time period B has not elapsed since the shift to the first sleep state (step S15: NO).

On the other hand, when the time period B has elapsed from the time of the shift to the first sleep state in the step S6 (step S15: YES), the CPU 8 shifts the current process to the first sleep state again (step S16) and then terminates the operation. As describe above, when the time period B has elapsed since the shift to the first sleep state in the step S6, the CPU 8 judges that the frequency of use by a user has decreased and shifts the current process from the second sleep state to the first sleep state again.

Figure 8:
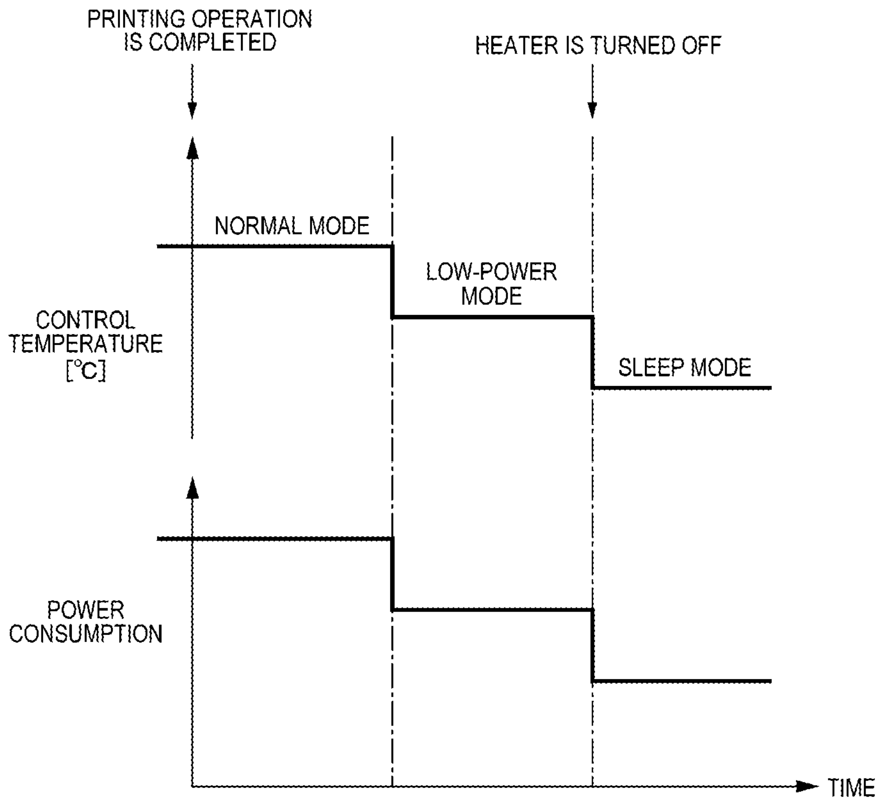
FIG. 8 is a diagram showing the relationship between the control temperature and power consumption when the temperature of the fixing device is lowered in steps as compared with the fixing device of Embodiment 1 of the present invention.

As shown in FIG. 8, in an image forming apparatus, a low-power mode in which the temperature is controlled to one lower than in the normal mode can be provided before the shift to the sleep mode in which power to the heater of the fixing device is turned off, so that the temperature and power consumption of the fixing device can be reduced in multiples stages. An image forming apparatus with such a configuration can improve the recovery time from low-power mode and reduce user stress.

However, even in such an image forming apparatus, the control temperature of the fixing device decreases rapidly in multiple stages before and after the shifts from normal mode to low-power mode and from low-power mode to sleep mode, resulting in a longer time taken before returning to normal mode. Thus, the image forming apparatus with the above configuration still has the disadvantage that the time-waiting stress for a user before and after the mode shifts increases rapidly.

In this embodiment, the current process shifts to the first sleep state in which temperature control is stopped from during non-image formation, and then shifts to the second sleep state in which the temperature control is performed to maintain the target temperature which is lower than the target temperature during the printing operation. In this case, the time period between the shift to the first sleep state and the shift to the second sleep state is set based on the detection temperature detected by the temperature sensor 366 during non-image forming. This minimizes the time-waiting stress for a user and reduces power consumption.

Embodiment 2

Figure 2:
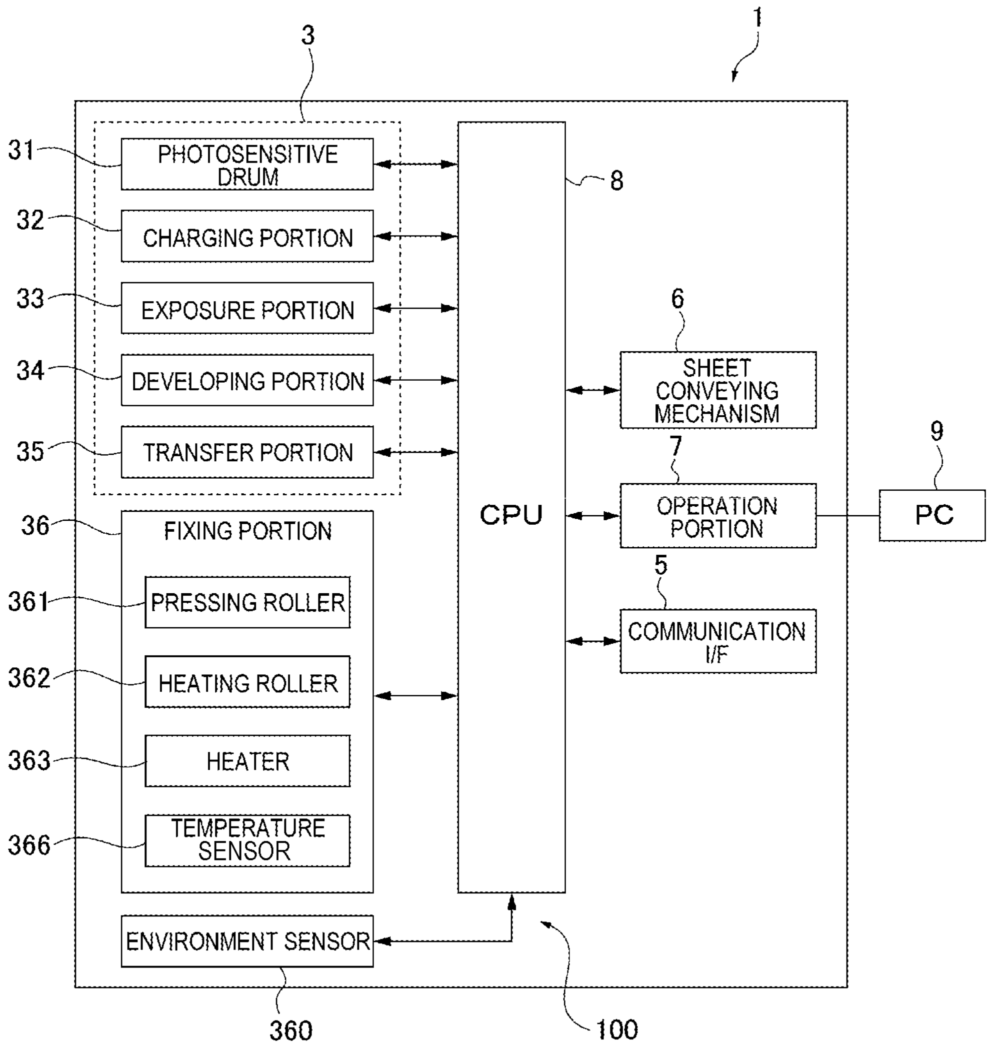
FIG. 2 is a block diagram of the image forming apparatus according to Embodiment 1 of the present invention.
Figure 3:
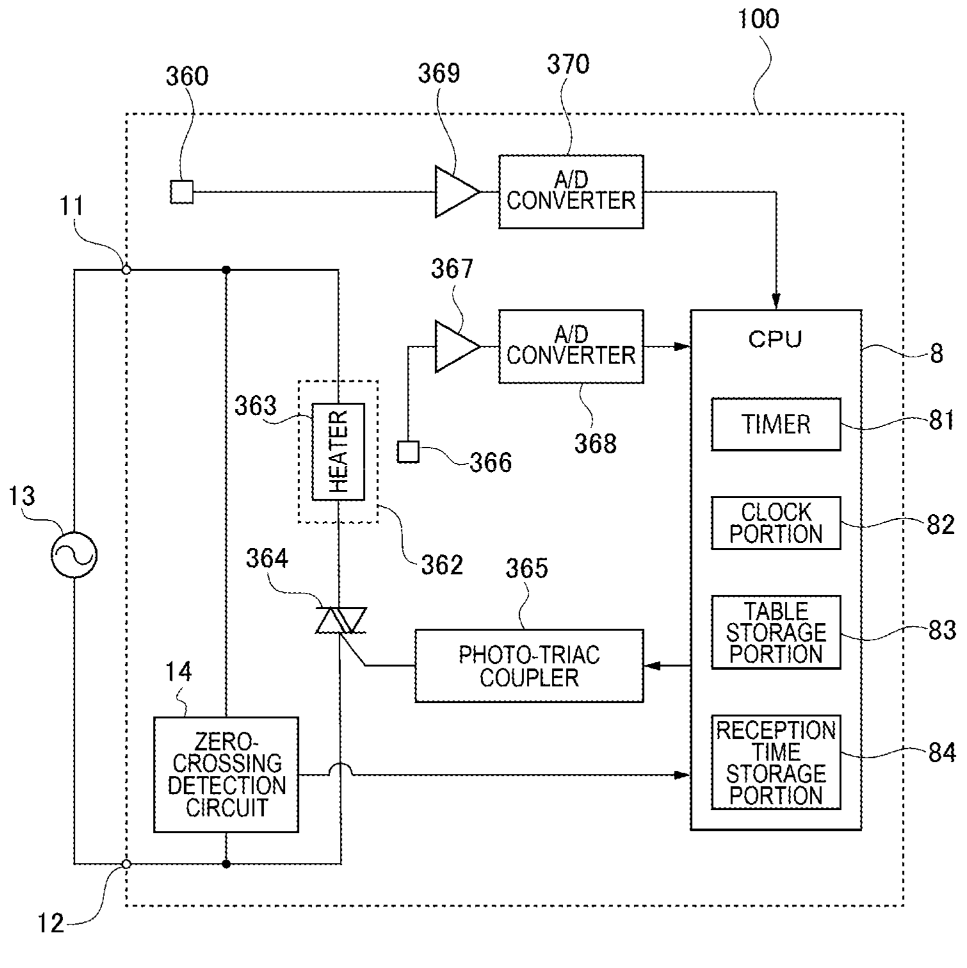
FIG. 3 is a block diagram showing a temperature control configuration of the fixing device of the image forming apparatus according to Embodiment 1 of the present invention.
Figure 4:
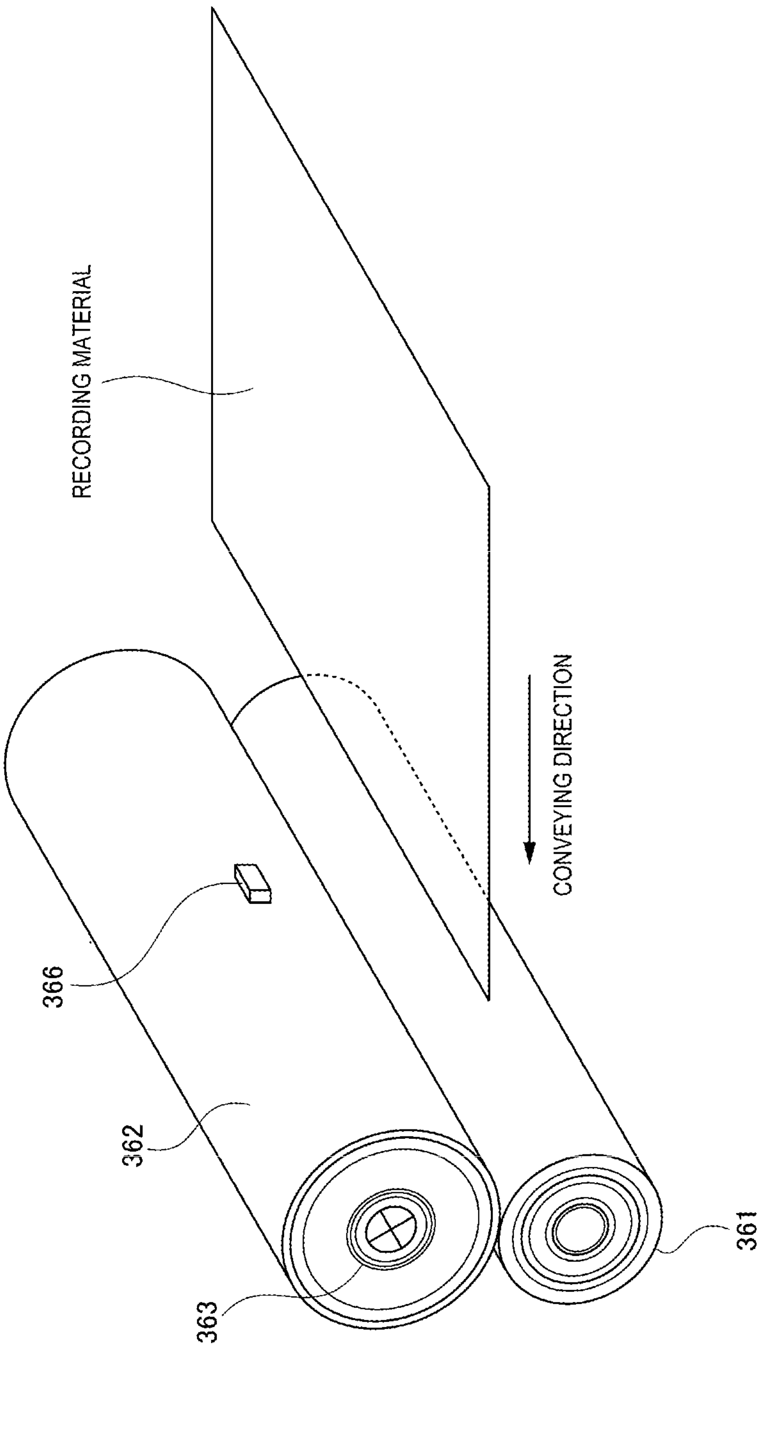
FIG. 4 is a diagram showing a schematic configuration of the fixing device of the image forming apparatus according to Embodiment 1 of the present invention.

The configuration of the image forming apparatus according to Embodiment 2 of the present invention is the same as that shown in FIGS. 1 and 2. Thus, the description thereof will be omitted. Further, the configuration of the fixing device for the present embodiment is the same as that shown in FIGS. 3 and 4. Thus, the description thereof will be omitted.

<Operation of Fixing Device>

The operation of the fixing device 100 according to Embodiment 2 of the present invention will be described in detail with reference to FIGS. 9 and 10.

The operation of the fixing device according to the present embodiment during printing operation to fix the toner image on the recording material is the same as that of the fixing device 100 of Embodiment 1 described above. Thus the description thereof will be omitted.

The present embodiment takes into account the fact the printing operation is performed when the temperature of the fixing portion 36 has decreased due to not using the image forming apparatus 1 for a long time period. Specifically, the CPU 8 sets the target temperature TTG to the control temperature TA during printing operation and performs the temperature control such that the temperature of the temperature sensor 366 becomes the control temperature TA.

However, when the image forming apparatus 1 is not in use for a long time period, a printing operation of a few sheets is not sufficient to store enough heat from the heating roller 362 to the peripheral components in the fixing portion 36 that do not directly contribute to the fixing operation. As a result, a decrease in temperature of the heating roller 362 during non-heating is significant. In contrast, the CPU 8 of the fixing device 100 according to the present embodiment shifts the current process to the standby state between the completion of the printing operation and the shift to the first sleep state and performs a temperature control for the predetermined time period Z [sec]. The time period Z is exemplified here as 10 [sec].

To begin with, the operation of the fixing device 100 in a case where a printing job is issued after the predetermined time period Y [sec] or more has elapsed as a waiting time period since the completion of the printing operation will be described in detail with reference to FIG. 9.

In the image forming apparatus 1, a printing job is issued at the time t11 when the time period Y [sec] or more as the waiting time period since the completion of the printing operation has elapsed. Here, the waiting time period is a time period between the completion of the printing operation and the issuance of the next printing job. The time period Y is exemplified here as 30 [sec].

Next, the CPU 8 performs a printing operation from the time t11 to the time t12, and then shifts the current process to a standby state at the time t12.

Next, the CPU 8 performs a temperature control to maintain the temperature of the heating roller 362 at the control temperature TB by turning on or off the triac 364 via the photo-triac coupler 365 from the time t12 to the time t13 when the time period Z [sec] elapses from the time t12.

Next, the CPU 8 shifts the current process from the standby state to the first sleep state at the time t13. The operation of the fixing device 100 in the first sleep state is the same as that of Embodiment 1 described above. Thus, the description thereof will be omitted.

At the time t14 when the time period X [sec] has elapsed from the time t13, the CPU 8 terminates the first sleep state and shifts the current process to the second sleep state. The method of calculating the time period X and the operation of the fixing device 100 in the second sleep state are the same as those in Embodiment 1 described above. Thus, the description thereof will be omitted.

The CPU 8 terminates the second sleep state at the time t15 when the time period B [sec] (B>X) has elapsed from the time t12.

Subsequently, the operation of the fixing device 100 in a case where a printing job is issued when the waiting time period from the completion of the printing operation is shorter than the predetermined time period Y [sec] will be described in detail with reference to FIGS. 11A and 11B.

In the image forming apparatus 1, a printing job is issued at the time t21 when the time period Y [sec] as the waiting time period since the completion of the printing operation has elapsed. The time period Y is exemplified here as 30 [sec].

Next, the CPU 8 performs a printing operation from the time t21 to the time t22, and then shifts the current process to a first sleep state at the time t22. The operation of the fixing device 100 in the first sleep state is the same as that of Embodiment 1 described above. Thus, the description thereof will be omitted.

At the time t23 when the time period X [sec] has elapsed from the time t22, the CPU 8 terminates the first sleep state and shifts the current process to the second sleep state. The method of calculating the time period X and the operation of the fixing device 100 in the second sleep state are the same as those in Embodiment 1 described above. Thus, the description thereof will be omitted.

The CPU 8 terminates the second sleep state at the time t24 when the time period B [sec] (B>X) has elapsed from the time t22.

Figure 9:
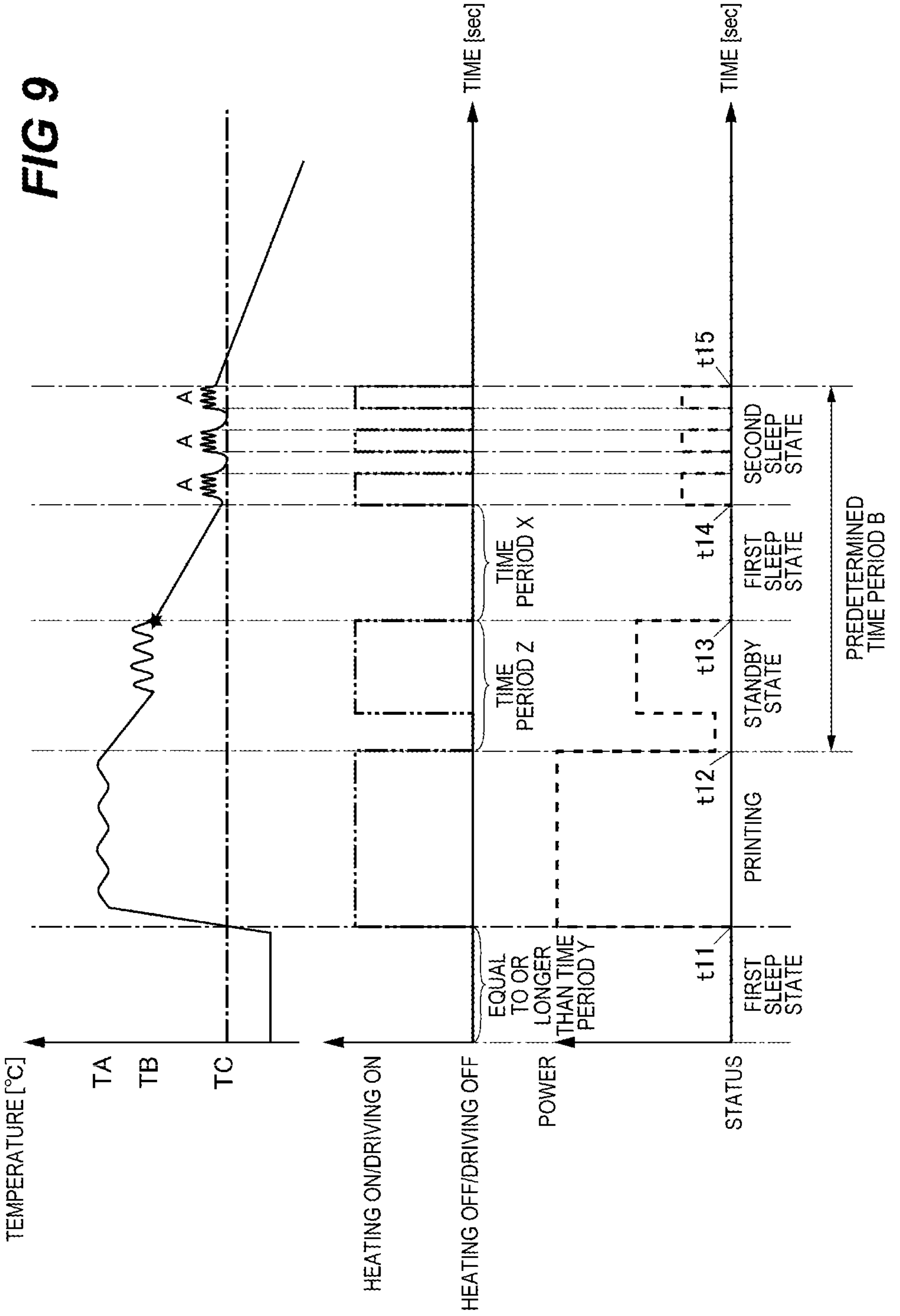
FIG. 9 is a diagram showing a timing chart for the case where a predetermined time period has elapsed since the completion of the printing operation of the fixing device according to Embodiment 2 of the present invention.
Figure 10:
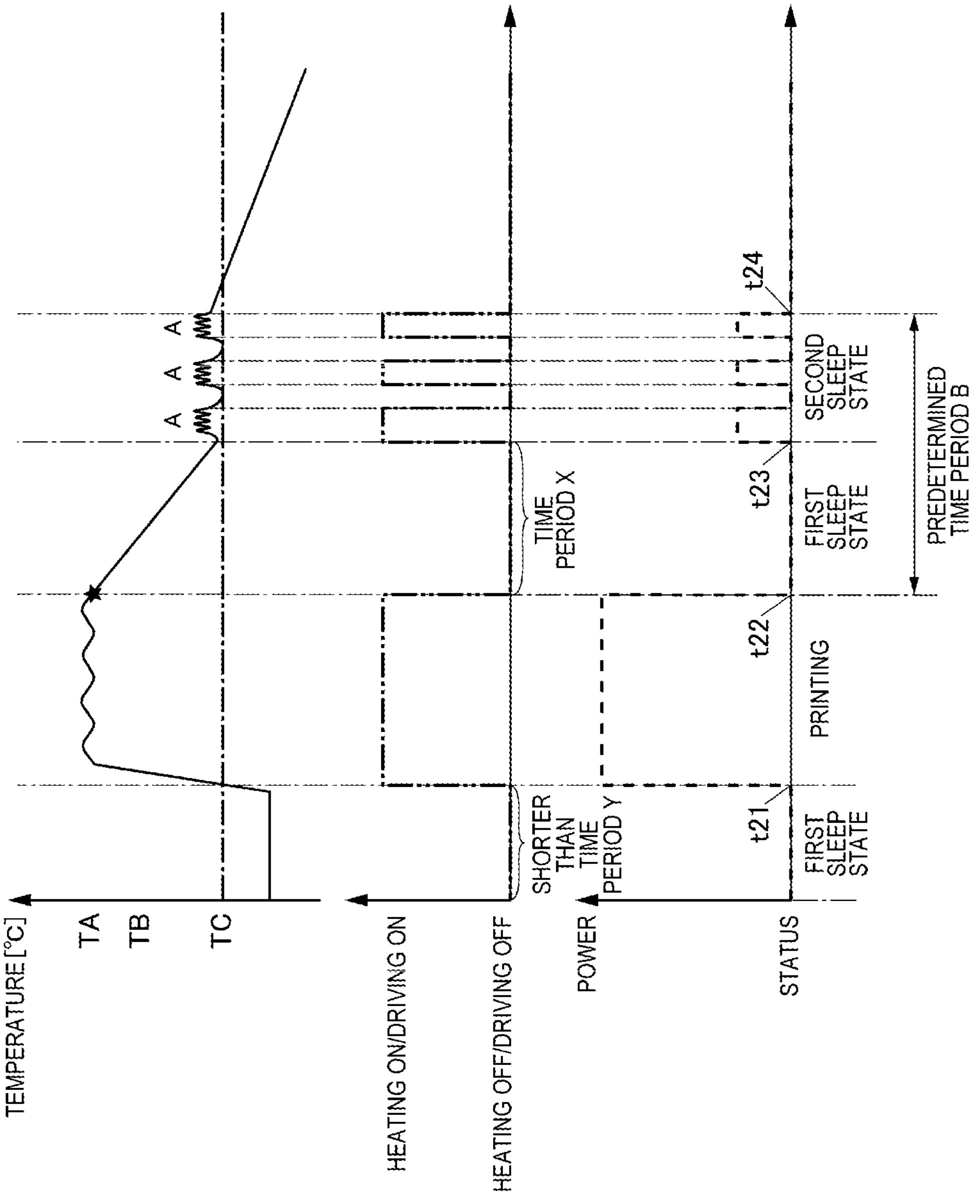
FIG. 10 is a diagram showing a timing chart in the case where a time period shorter than a predetermined time period has elapsed since the completion of the printing operation of the fixing device according to Embodiment 2 of the present invention.

Thus, the CPU 8 operates differently in the cases shown in FIGS. 9 and 10, between which the timing of issuance of a printing job is different.

<Operation of Image Forming Apparatus>

The operation of the image forming apparatus 1 according to Embodiment 2 will be described in detail with reference to FIGS. 11A and 11B.

Figure 11A:
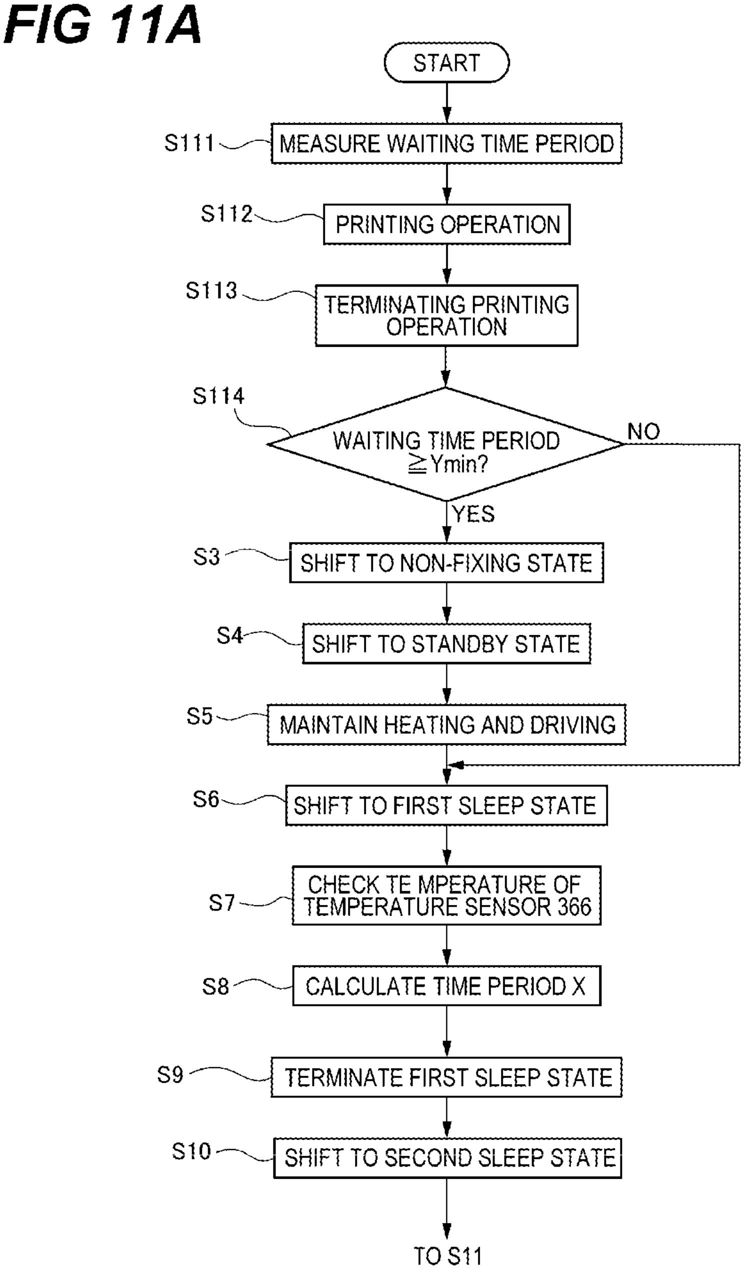
FIG. 11A is a flowchart showing the first half of the operations of fixing device according to Embodiment 2 of the present invention.
Figure 11B:
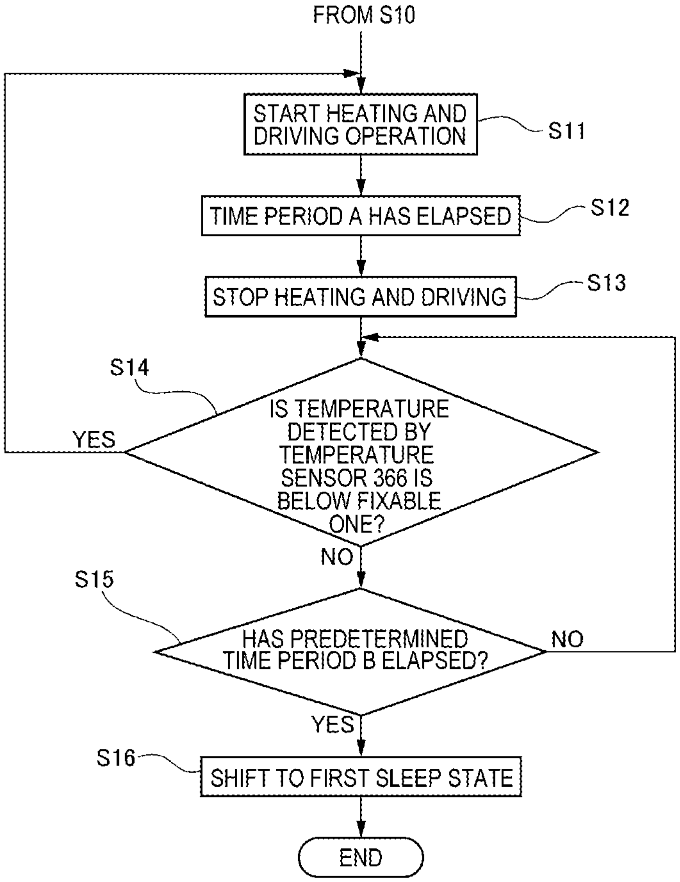
FIG. 11B is a flowchart showing the latter half of the operations of fixing device according to Embodiment 2 of the present invention.

In FIGS. 11A and 11B, the operations same as those in FIGS. 7A and 7B will be described with the same step numbers and description thereof will be omitted.

The CPU 8 measures the waiting time period since the completion of the printing operation (step S111).

Next, the CPU 8 obtains printing data and printer control commands from the PC 9 via the communication I/F 7 as image forming operation instructions to the image forming apparatus 1. The image forming operation instructions are made in response to the operation of a user of the PC 9 for performing a printer operation of the image forming apparatus 1. The CPU 8 then performs a printing operation based on the obtained printing data and the printer control commands (step S112), and then terminates the printing operation (step S113).

Next, the CPU 8 determines whether the measured waiting time period is equal to or longer than the time period Y (step S114).

The CPU 8 starts the operation in the step S3 if the waiting time period is equal to or longer than the time period Y (step S114: YES).

On the other hand, when the waiting time period is shorter than the time period Y (step S114: NO), the CPU 8 starts the operation of the step S6.

In the present embodiment, when a printing operation is performed, if the waiting time period before the printing operation is equal to or longer than the time period Y, the image forming apparatus 1 shifts to the first sleep state after the image forming apparatus 1 shifts to the standby state after the print operation is completed. Further, when a printing operation is performed, if the waiting time period before the printing operation is shorter than the time period Y, the image forming apparatus 1 shifts to the first sleep state without shifting to the standby state after the printing operation is completed. In addition to the effects of Embodiment 1 described above, when the printing operation is performed again after the print operation is completed, the time-waiting stress for a user can be minimized and power consumption can be reduced.

Embodiment 3

The configuration of the image forming apparatus according to Embodiment 3 of the present invention is the same as that shown in FIGS. 1 and 2. Thus, the description thereof will be omitted. Further, the configuration of the fixing device for the present embodiment is the same as that shown in FIGS. 3 and 4. Thus, the description thereof will be omitted.

<Operation of Fixing Device>

Figure 12:
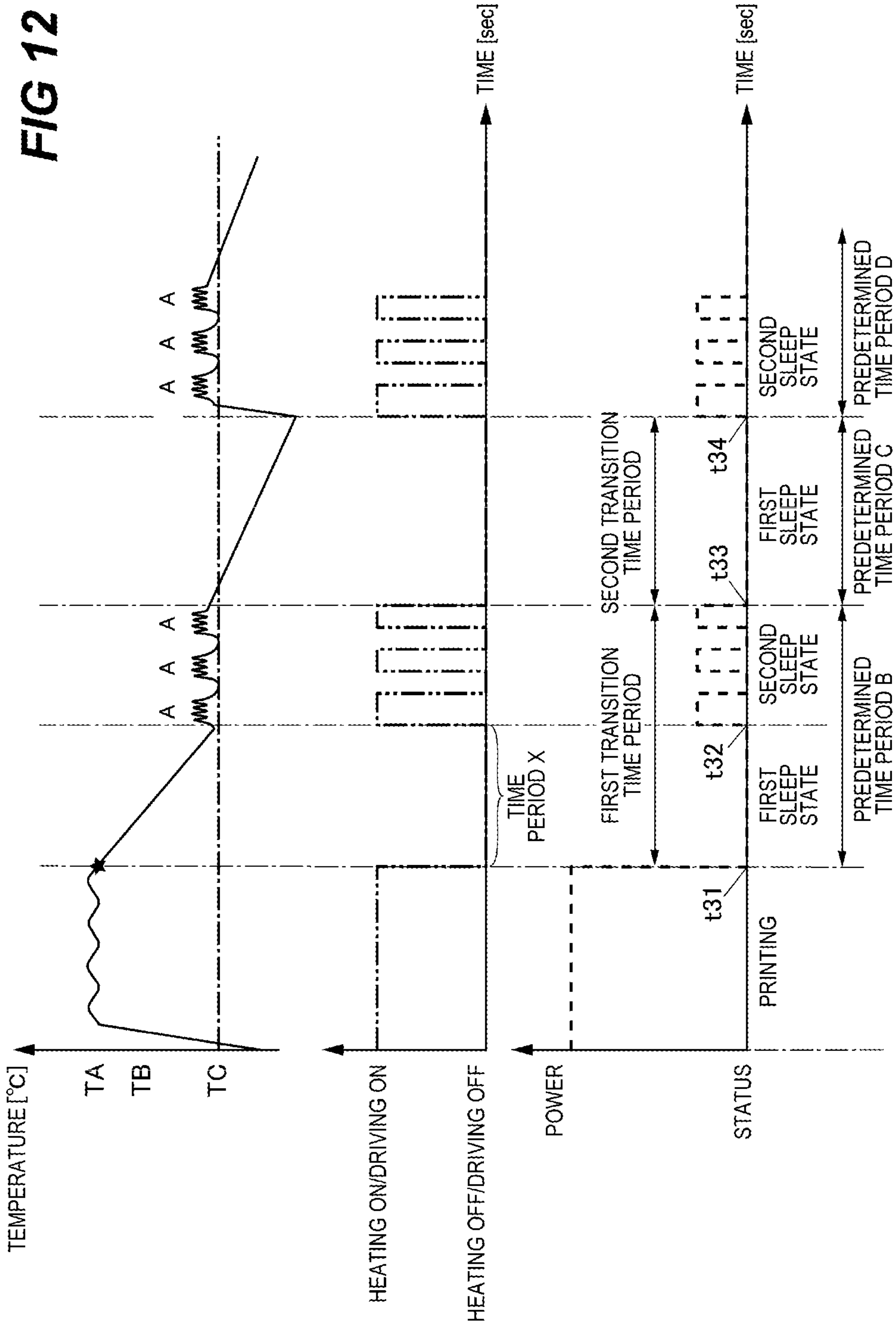
FIG. 12 is a diagram showing a timing chart of the fixing device of the image forming apparatus according to Embodiment 3 of the present invention.

The operation of the fixing device 100 according to Embodiment 3 of the present invention will be described in detail with reference to FIG. 12.

The operation of the fixing device according to the present embodiment during printing operation to fix the toner image on the recording material is the same as that of the fixing device 100 of Embodiment 1 described above. Thus the description thereof will be omitted.

The present embodiment takes into account the fact that there are time periods in which no printing jobs are generated, causing that the frequency of the use of the image forming apparatus 1 is low, such as work breaks of a user. Specifically, the CPU 8 of the fixing device 100 shifts the current process to the first sleep state in which temperature detection by the temperature sensor 366 is not performed during the time period of infrequent use of the image forming apparatus 1 after the printing operation is completed. After a predetermined time period, which assumes user's breaks has elapsed, in which the first sleep state is maintained, the CPU 8 shifts the current process to the second sleep state, in which the heating operation to maintain the control temperature TC and the drive operation synchronized with the heating operation are performed, assuming that the frequency of use will be higher.

The CPU 8 continues the printing operation until the time t31 when it shifts the current process to the first sleep state at the time t31. The operation of the fixing device 100 in the first sleep state is the same as that of Embodiment 1 described above. Thus, the description thereof will be omitted.

At the time t32, when the time period X [sec] as the first predetermined time has elapsed from the time t31, the CPU 8 terminates the first sleep state and shifts the current process to the second sleep state. The CPU 8 maintains the second sleep state for the second predetermined time period (the time period B−the time period X) from the time t32. The method of calculating the time period X and the operation of the fixing device 100 in the second sleep state are the same as those in Embodiment 1 described above. Thus, the description thereof will be omitted.

At the time t33, when the time period B [sec] (B>X) has elapsed from the time t31, the CPU 8 terminates the second sleep state and again shifts the current process to the first sleep state.

At the time t34, when the time period C [sec] as the third predetermined time period has elapsed from the time t33, the CPU 8 terminates the first sleep state and shifts the current process to the second sleep state. Here, the time period C is set according to time zones in which the image forming apparatus 1 is used infrequently, and can be set by the user's operation on the operation portion 6. The time zones in which the image forming apparatus 1 is infrequently used include breaks, after work hours, or at night, for example.

The CPU 8 shifts the current process to the second sleep state after the time period C has elapses and turns on the heater 363 to bring the heating roller 362 to a temperature lower than the control temperature TC (third temperature).

The CPU 8 continues the second sleep state until the predetermined time D [sec] has elapsed from the time t34.

<Operation of Image Forming Apparatus>

Figure 13A:
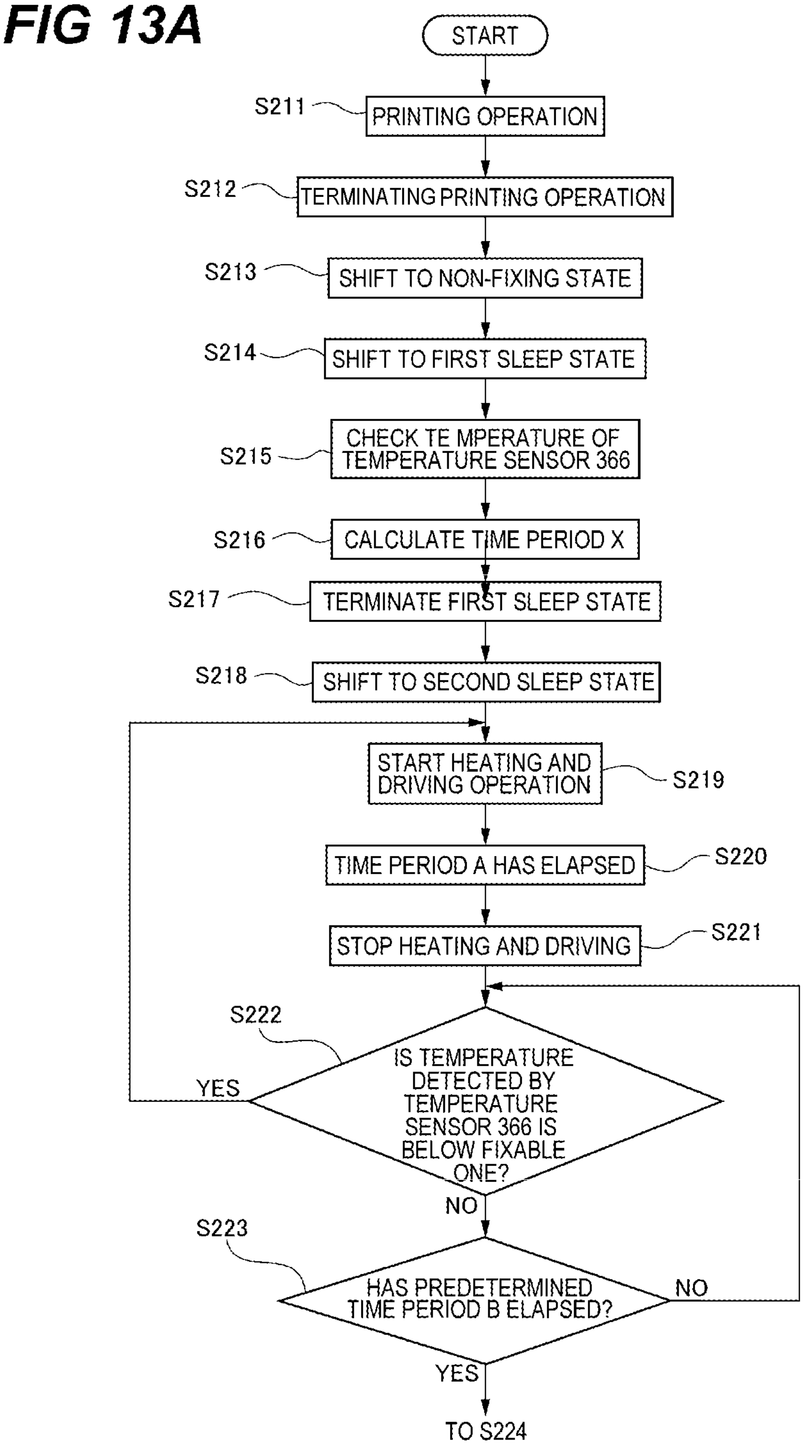
FIG. 13A is a flowchart showing the first half of the operations of fixing device according to Embodiment 3 of the present invention.
Figure 13B:
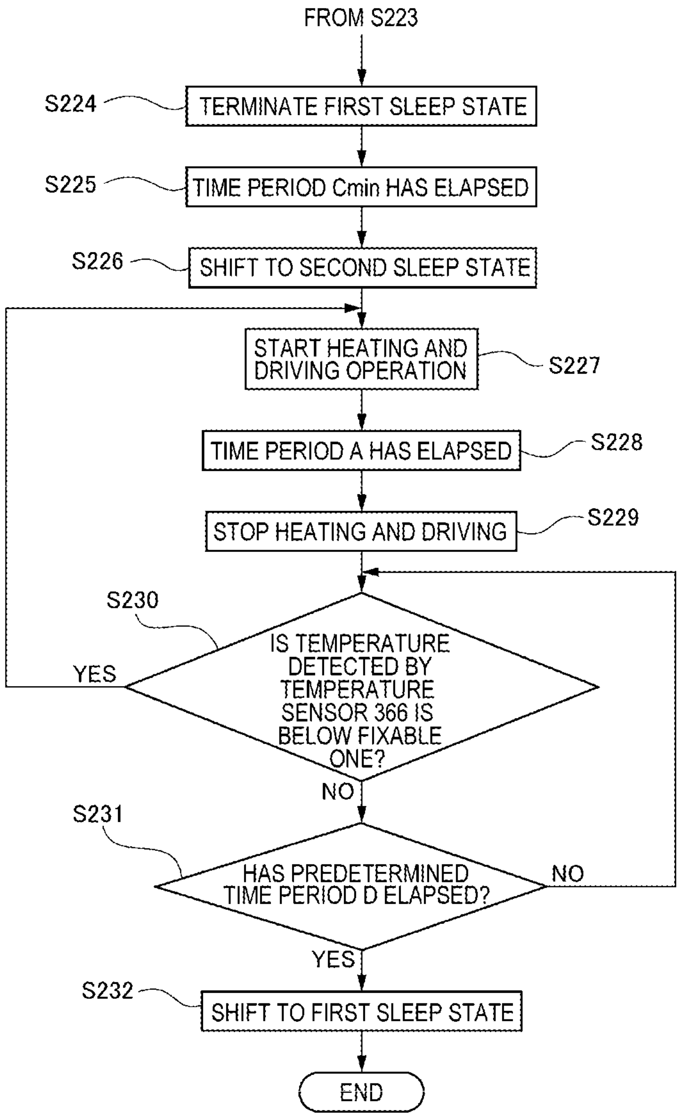
FIG. 13B is a flowchart showing the latter half of the operations of fixing device according to Embodiment 3 of the present invention.
Figure 14:
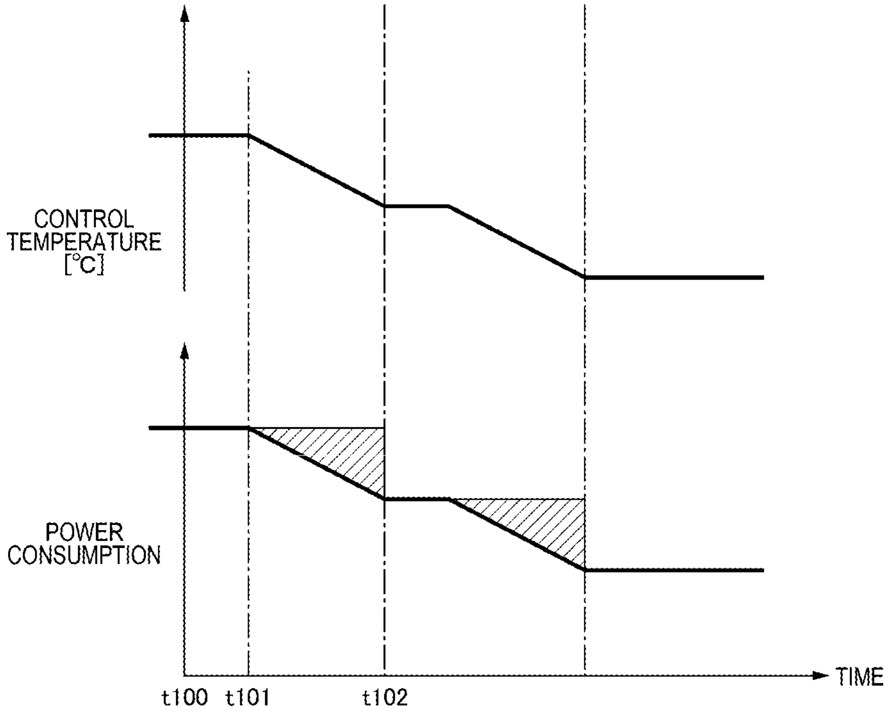
FIG. 14 is a diagram showing the relationship between the control temperature and power consumption of a conventional fixing device.

The operation of the image forming apparatus 1 according to Embodiment 3 of the present invention will be described in detail with reference to FIGS. 13A and 13B.

Next, the CPU 8 obtains printing data and printer control commands from the PC 9 via the communication I/F 7 as image forming operation instructions to the image forming apparatus 1. The image forming operation instructions are made in response to the operation of a user of the PC 9 for performing a printer operation of the image forming apparatus 1. The CPU 8 then performs a print operation based on the obtained printing data and the printer control commands (step S211), and then terminates the printing operation (step S212).

Next, the CPU 8 shifts the heating roller 362 and the pressing roller 361 from the pressing state to the non-pressing state to put the fixing portion 36 in the non-fixing state (step S213).

Next, the CPU 8 shifts the current process to the first sleep state in low power mode (step S214).

Next, the CPU 8 obtains the detection temperature T detected by the temperature sensor 366 and checks the detection temperature T (step S215).

Next, the CPU 8 calculates the time period X based on the detection temperature T detected by the temperature sensor 366, the environment temperature TD detected by the environment sensor 360, and the table stored in table storage portion 83 (step S216).

Next, the CPU 8 terminates the first sleep state after the time period X has elapsed since the shift to the first sleep state (step S217).

Next, the CPU 8 shifts the current process to the second sleep state where the control temperature TC is maintained (step S218).

Next, the CPU 8 monitors the detection temperature T detected by the temperature sensor 366 based on the electrical signal input from the temperature sensor 366. The CPU 8, then, turns on the triac 364 via the photo-triac coupler 365 to start the heating and temperature control operation and the rotational driving operation (step S219).

Next, the CPU 8 turns off the triac 364 via the photo-triac coupler 365 when the time period A has elapsed since the operation of the step S219 is started (step S220). As a result, the heating and temperature control operation and the rotational driving operation are stopped (step S221).

Next, the CPU 8 determines whether the detection temperature T detected by the temperature sensor 366 is below the control temperature TC, which is the fixable temperature (step S222).

The CPU 8 returns the current process to the operation of the step S219 when the detection temperature T detected by the temperature sensor 366 falls below the control temperature TC (step S222: YES).

On the other hand, if the detection temperature T detected by the temperature sensor 366 is equal to or higher than the control temperature TC (step S222: NO), the CPU 8 determines whether the time period B has elapsed since the shift to the first sleep state (step S223).

The CPU 8 returns the current process to the operation of the step S222 when the time period B has not elapsed since the shift to the first sleep state (step S223: NO).

On the other hand, when the time period B has elapsed from the time of the shift to the first sleep state (step S223: YES), the CPU 8 shifts the current process to the first sleep state again (step S224).

Next, the CPU 8 terminates the first sleep state and shifts the current process to the second sleep state (step S226) after the time period C has elapsed since the shift to the first sleep state in the step S224 (step S225). At this time, the CPU 8 sets the time period C based on the current time obtained by the clock portion 82.

Next, the CPU 8 monitors the detection temperature T detected by the temperature sensor 366 based on the electrical signal input from the temperature sensor 366. The CPU 8, then, turns on the triac 364 via the photo-triac coupler 365 to start the heating and temperature control operation and the rotational driving operation (step S227).

Next, the CPU 8 turns off the triac 364 via the photo-triac coupler 365 when the time period A has elapsed since the operation of the step S227 is started (step S228). As a result, the heating and temperature control operation and the rotational driving operation are stopped (step S229).

Next, the CPU 8 determines whether the detection temperature T detected by the temperature sensor 366 is below the control temperature TC, which is the fixable temperature (step S230).

The CPU 8 returns the current process to the operation of the step S227 when the detection temperature T detected by the temperature sensor 366 falls below the control temperature TC (step S230: YES).

On the other hand, if the detection temperature T detected by the temperature sensor 366 is equal to or higher than the control temperature TC (step S230: NO), the CPU 8 determines whether the time period D has elapsed since the shift to the second sleep state in the step S226 (step S231).

The CPU 8 returns the current process to the operation of the step S230 when the time period D has not elapsed since the shift to the second sleep state (step S231: NO).

On the other hand, when the time period D has elapsed from the time of the shift to the second sleep state (step S231: YES), the CPU 8 shifts the current process to the first sleep state again (step S232) and then terminates the operation.

Here, the time period B from the time t31 to the time t33 is defined as a first transition time period. Namely, the first transition time period is a time period from the completion of the image forming operation to the completion of the first and second sleep states. The time period C from the time t33 to the time t34 is defined as a second transition time period. The second transition time period is longer than the first transition time period. The sum of the first transition time and the second transition time is exemplified here as 60 [min]. The time period C is exemplified here as 56 [min]. The time period D is exemplified here as 200 [sec].

In the present embodiment, after shifting to the second sleep state, the current process is shifted to the first sleep state again, and after shifting to the first sleep state again, the first sleep state is maintained for the time period C corresponding to the frequency of use of the fixing device 100. As a result, in addition to the effects of Embodiment 1 described above, power consumption can further be reduced.

The invention is not limited to the above embodiments, but can be transformed in various ways without departing from the gist thereof.

Specifically, in Embodiments 1 to 3 described above, the time period X is corrected using the environment temperature TD detected by the environment sensor 360. However, not limited to this configuration, the time period X may be corrected using both the environment temperature TD and the environment humidity detected by the environment sensor 360.

Further, in Embodiments 1 to 3 described above, the time period X is corrected using the environment temperature TD detected by the environment sensor 360. However, not limited to this configuration, the time period X may not be corrected using the environment temperature TD detected by the environment sensor 360.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-067306, filed Apr. 17, 2023, which is hereby incorporated by reference herein in its entirety.

What is claimed is:

1. An image forming apparatus comprising;

an image forming portion that forms a toner image on the recording material;

a fixing device that thermally fixes the toner image formed on the recording material, the fixing device comprises:

a heating rotating member having a heater and heated by the heater;

a pressure rotating member that forms a nip by contacting the heating rotating member, the pressure rotating member fixing the toner image onto the recording material together with the heating member;

a temperature detecting portion for detecting the temperature of the heating rotating member; and a control portion for controlling the heater based on the detection results of the temperature detecting portion;

wherein the control portion is configured to execute a:

(i) a first mode, executed for a first predetermined time during a non-image forming period from the end of an image forming job until the next image forming job is input, maintaining the temperature of the heating rotating member at a first predetermined temperature while rotating the heating rotary member;

(ii) a second mode, executed for a second predetermined time during the non-image forming period after the first mode is executed, which stops rotation of the heating rotating member and turns off power to the heater from the end of the first mode until the second predetermined time elapses; and (iii) a third mode, executed after executing the second mode, the third mode comprising: a first period during which power supply of the heater is controlled while rotating the heating rotating member to maintain its temperature at a second predetermined temperature lower than the first predetermined temperature; and a second period following the first period, the second period being a period during which power to the heater is stopped based on the detection result of the temperature detecting portion while the rotation of the heating rotary member is stopped, until the temperature of the heating rotary member drops to a temperature lower than the second predetermined temperature.

2. The image forming apparatus according to claim 1, wherein the control portion changes a duration of the second predetermined time based on the detection result of the temperature detecting portion at an end of the first mode.

3. The image forming apparatus according to claim 1, wherein when the detection result of the temperature detecting portion at the end of the first mode is a first temperature, the second predetermined time is a first time, and wherein when the detection result of the temperature detecting portion at the end of the first mode is a second temperature, which is greater than the first temperature, the second predetermined time becomes a second time, which is greater than the first time.

4. The image forming apparatus according to claim 1, wherein the temperature detecting portion does not detect a temperature of the heating rotating member in the second mode.

5. The image forming apparatus according to claim 1, further comprising a second temperature detecting portion which detects a temperature outside the image forming apparatus, wherein the control portion corrects the second predetermined time based on the temperature detected by the second temperature detecting portion.

6. The image forming apparatus according to claim 1, wherein the temperature of the heating rotary member while the recording material is passing through the nip section is higher than the first predetermined temperature.

7. The image forming apparatus according to claim 1, further comprising an operation portion with which a user can operate a setting of the image forming apparatus, wherein in the first mode, it is possible to transition to the second mode based on an instruction from the operation unit.

8. The image forming apparatus according to claim 1, wherein during execution of the first mode, the second mode and the third mode, the heating rotary member and the pressure rotating member are separated.

9. The image forming apparatus according to claim 1, wherein in the second mode, the control portion turns off the power supplied to the fixing device, placing it in a sleep state where heating operations by the fixing device, drive operations, and temperature detection by the temperature detecting means are not performed.

* * * * *